No. 637,866. Patented Nov. 28, 1899.
H. B. HAIGH.
TREAD FOR WHEELS, STAIRS, STEPS, OR THE LIKE.
(Application filed Mar. 29, 1899.)
(No Model.)

Witnesses.
Clarence E. Mehlhope
N. G. Edwards.

Inventor.
Henry B. Haigh
by Alfred M. Allen
Attorney.

THE NORRIS PETERS CO., PHOTO-LITHO., WASHINGTON, D. C.

UNITED STATES PATENT OFFICE.

HENRY B. HAIGH, OF NEW YORK, N. Y.

TREAD FOR WHEELS, STAIRS, STEPS, OR THE LIKE.

SPECIFICATION forming part of Letters Patent No. 637,866, dated November 28, 1899.

Application filed March 29, 1899. Serial No. 710,390. (No model.)

*To all whom it may concern:*

Be it known that I, HENRY B. HAIGH, a citizen of the United States, residing at New York, (Brooklyn,) county of Kings, State of New York, have invented certain new and useful Improvements in Treads for Wheels, Pulleys, Stairs, or the Like, of which the following is a full, clear, and exact description, reference being had to the accompanying drawings, forming part of this specification.

My invention relates to a certain new and useful construction of tread-surfaces for wheels, pulleys, steps, coverings, and the like in which it is sought to provide a durable non-slipping contact-surface.

It has long been customary to employ soft rubber for various descriptions of contact bearing-surfaces as a covering to prevent slipping; but naturally the rubber being soft it soon wears away when the tread-surface is made up entirely of the soft rubber, and when the rubber is inserted in grooves in the tread the wear soon brings the rubber flush with the surface of the tread, so that the effect of the inserted rubber is practically lost.

It is the purpose of my invention to employ soft rubber on account of its non-slipping qualities, but to provide, as hereinafter pointed out and claimed, so that when inserted in suitable grooves in the tread-surface provision may be made to relieve the rubber surface from the natural wear to which it would otherwise be subjected.

Figure 1:
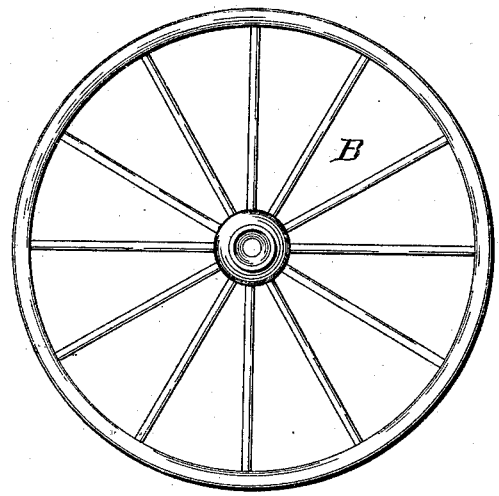
Figure 2:
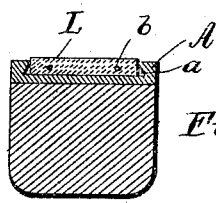
Figure 3:
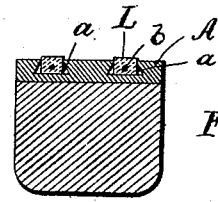
Figure 4:
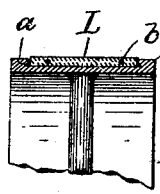
Figure 5:
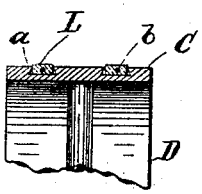
Figure 6:
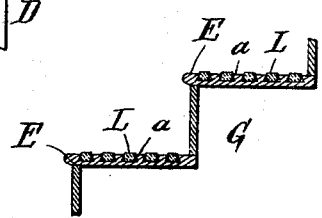

In the drawings, Figure 1 is a side elevation of a vehicle-wheel employing my invention. Figs. 2 and 3 are cross-sections of the felly and tire of same, showing a single and a plurality of rubber strips inserted in the tire. Figs. 4 and 5 are similar cross-sections of the face or rim of a pulley. Fig. 6 is a cross-section of a portion of a stairway employing my improved tread.

For any tread-surface of the character suggested in the drawings, whether it be the tire A of a vehicle-wheel B or the rim or face C of a pulley D or the tread E of a stair G, I form dovetailed grooves in the tread-surface. A single groove is provided, as shown in Figs. 2 and 4, when the width and character of the tread permit of it, or a plurality of grooves, as shown in Figs. 3, 5, and 6, are formed, as may be desired. This latter construction is the preferable and in many cases the necessary construction to carry out my invention, as will hereinafter appear. Within the dovetailed grooves thus formed I insert strips of rubber L of such thickness as to bring the upper surface of rubber a little above the ordinary tread and of such width as to fill the groove above, but to leave spaces $a$ $a$ at or near the base of the groove. The rubber strips are held in the grooves in any suitable way. For wheels, pulleys, and the like wires $b$ are threaded through the strips lengthwise, and the strips being in a single piece, but not continuous, the wires are caught together at the ends to secure the rubber in the same manner as cushion-tires are ordinarily secured to vehicle-wheels. When desired, the rubber strips may be vulcanized at the base or protected from wear by a canvas or other suitable backing. With this construction of elastic packing, in which the contact-surface of the rubber extends only slightly above the ordinary tread-surface and the usual tread receives the wear of the surface contacting therewith in connection with the rubber, the spaces $a$ $a$ play a most important part in the life and durability of the structure.

To form a perfect non-slipping surface, all that is necessary is that the rubber shall come first in contact with the opposing surface. The friction prevents the slip and the rubber then contracts. If there were no spaces $a$ $a$ in the retaining-grooves, this contraction would bring the wear all on the surface of the rubber, and in a very short time we would have it flush with the ordinary tread-surface and the efficacy of the packing would be largely lost; but with only a slight amount of rubber extending above the surface only a slight contraction is needed to stop the wear on the rubber, and the spaces of the groove are amply sufficient to take up this contraction, allowing the rubber to expand and preventing wear. Just how wide and deep the grooves should be, how broad the rubber surface, or how much space it is impossible to say for any given case; but the extent of the rubber above the ordinary tread must bear such relation to the open spaces that the amount of contraction of the rubber under compression may be taken up by the space for expansion. For this reason I have suggested the plurality of grooves and strips for the tire and pulley-face, although I do not wish to limit myself to a plurality of strips when a single somewhat-broader strip will accomplish the result. It will also be understood that my strips of rubber may be used with wooden-faced pulleys and the ordinary wood stair-tread, as well as with metal treads. The essential feature of the invention is that spaces shall be left below the surface of the grooves and that only a slight portion of the packing shall extend above the ordinary tread-surface, so that the wear shall come on the ordinary tread, the rubber packing serving to prevent slipping and any tendency to wear down flush with the surface being prevented by the ability of the rubber to expand into the open spaces. Moreover, I do not consider it essential that the open spaces within the groove should be at the sides or that the groove should be necessarily dovetailed. What I seek to do is to combine the rubber packing with the ordinary tread-surface, allow the ordinary tread to receive the wear, employ the packing to prevent slipping, and provide space to allow the rubber to contract without wear on the packing. This result can be accomplished by open spaces at other positions within the groove or even by forming a longitudinal opening within the rubber or when a wire is used for attaching the packing to wheels, pulleys, and the like by constructing the wire-recess larger than the diameter of the wire.

Having thus described my invention, what I claim, and desire to secure by Letters Patent, is—

A tread for wheels, stairs, steps, and the like, bearing-surfaces, provided with one or more grooves, and an elastic packing therefor fitting within said grooves but not completely filling same, with the upper surface of said packing extending only slightly above the top surface of the ordinary tread, so that the ordinary tread will receive the wear and the packing may be depressed flush with the surface without wear, substantially as shown and described.

HENRY B. HAIGH.

Witnesses:
GEO. H. FULLERTON,
DAVID BROWER, Jr.